United States Patent Office 2,738,360
Patented Mar. 13, 1956

2,738,360

CATALYTIC HYDROGENATION OF CARBON MONOXIDE IN THE PRESENCE OF ACETYLENE

Walter Rottig, Oberhausen-Sterkrade-Nord, Germany, assignor to Ruhrchemie Aktiengesellschaft, Oberhausen-Holten, a corporation of Germany, and Lurgi Gesellschaft für Warmetechnik m. b. H., Frankfurt (Main-Heddernheim), Germany, a corporation of Germany No Drawing. Application May 16, 1950,
Serial No. 162,383

Claims priority, application Germany June 4, 1949

8 Claims. (Cl. 260—449.6)

This invention relates to improvements in the catalytic hydrogenation of carbon monoxide.

It is known that with iron catalysts the synthesis temperature has a direct relation to the catalyst load capacity and to the formation of high molecular hydrocarbons. A greater proportion of high molecular hydrocarbons are obtained only if a lower synthesis temperature is used. In these circumstances, however, the possible load capacity is very small and the ($CO+H_2$) conversion barely exceeds 40%–50% by volume. Though increased synthesis temperatures increase the conversion, they cause an increased methane formation, and a reduction in the formation of normally solid hydrocarbons (paraffin waxes).

It has very surprisingly been observed that a sufficiently high conversion is obtained at reduced temperatures with iron catalysts, particularly when impregnated with alkali salts of a non-volatile acid, such as potassium phosphate and/or potassium silicate, if synthesis gases are used which contain acetylene or other acetylenic hydrocarbons. The required acetylene content is about 0.5%–10% by volume, preferably 0.5–1% by volume. The reduction possible in the synthesis temperature amounts to approximately 20° C. Suitable iron catalysts may be those of the conventional Fischer-Tropsch synthesis type.

In the process according to the invention, that is to say, if 0.5%–10% by volume acetylene are added, conversions of 65%–70% by volume may be obtained at synthesis temperatures of 195° C.–200° C., the methane formation remaining below 7%. If acetylene is not added, total conversion of only 40%–50% by volume is obtained at these temperatures, and though at an increased synthesis temperature of 220° C.–225° C. a ($CO+H_2$) conversion of 65%–70% by volume is obtained, there is a methane formation of 12%–16% by volume.

A further advantage of the process according to the invention lies in the fact that, due to the reduced synthesis temperature, a high yield of hydrocarbons boiling above 320° C. is obtained. Approximately 30% of hydrocarbons boiling above 320° C. are obtained including the paraffin or waxy material which may be extracted from the catalyst when regeneratively extracting the same with suitable solvents in conventional manner.

If acetylene is added according to the process of the invention, not only the initial temperatures required for the synthesis reaction with the iron catalysts but also the total permissive range of gradual increase in the synthesis temperature upon each drop in efficiency of the catalyst is thereby increased by about 20° C. as compared with such temperature range when the gases used are free from acetylene. In this way, there is also a considerable lengthening in the life of the catalyst (before regeneration becomes necessary), especially when considering the fact that efficiency restoring temperature increases are relatively low, in many cases about 1°–2° C. each time.

A high impregnation of the iron catalyst with alkali salts of a non-volatile acid is particularly advantageous. The alkali content (calculated as $K_2O$) may amount to 1%–10% by weight $K_2O$, preferably 3% $K_2O$ by weight of the iron content.

The acetylenic hydrocarbon that may be added to the synthesis gases include in addition to acetylene other gaseous hydrocarbons with a triple bond, such as vinylacetylene, methylacetylene and similar compounds. Part of the acetylene or other triple bond hydrocarbon may be replaced by hydrocarbons with a double bond, for example ethylene.

Especially advantageous results are obtained with a catalyst derived from a $H_2$ reducible Fe material by a reducing treatment with a mixture of hydrogen and nitrogen at a temperature of about 250° C. and a rate of gas flow of about 1–2 m./sec.

The extent to which iron catalysts are critical to the particular results obtained in accordance with this invention is shown by German Patent No. 764,165. In this patent the use of synthesis gas containing acetylene or other triple bond hydrocarbons is proposed with cobalt catalysts resulting in the formation of increased olefin yields.

Example 1

From a solution of the corresponding nitrates, a catalyst material was precipitated with potassium carbonate to contain 100 parts by weight iron and 5 parts by weight copper. After thorough washing the precipitated slurry was impregnated with normal potassium orthophosphate ($KH_2PO_4$) in such manner that the finished catalyst contained by weight 3 parts $K_2O$ to 100 parts iron (Fe). After reduction the finished catalyst had a reduction value equivalent to 40% by weight free iron.

When this catalyst was contacted with 100 normal litres of water gas per litre catalyst per hour, there resulted a ($CO+H_2$) conversion of 50%–55% by volume at a synthesis temperature of 200° C. The methane formation amounted to approximately 11% of the liquid synthesis products. The synthesis products, including the paraffin wax obtained in the catalyst extraction, consisted of approximately 20% by weight hydrocarbons boiling above 320° C.

When water gas containing 1.5% by volume of acetylene was converted with the same catalyst, and the same load at 200° C., the ($CO+H_2$) conversion was increased to 70%–72% by volume. The methane formation was reduced to approximately 7%. Approximately 30% by weight of the synthetic products, including the paraffin wax obtainable by means of catalyst extraction, consisted of hydrocarbons boiling above 320° C.

The precipitated and dried catalyst was reduced at 250° C. with a hydrogen-nitrogen mixture which was passed at a flow velocity of 1.4 m. per second for 60 minutes over the catalyst. The gas flow velocity must be between 1 and 2 m. per second.

Example 2

From a solution of the corresponding nitrates, a catalyst material was precipitated at a pH value of 7 with sodium carbonate solution to contain 100 parts by weight iron, 5 parts by weight copper and 5 parts by weight $K_2O$. After drying and shaping, this catalyst was reduced at 300° C. with a gas mixture consisting of 75 parts by volume of hydrogen and 25 parts by volume of nitrogen which was passed at flow velocity of approximately 1.3 m. per second for three hours over the catalyst. After reduction the content of free iron of the catalyst was 62% by weight of the total iron content.

In the carbon monoxide hydrogenation, a synthesis gas containing 36% by volume carbon monoxide, 46% by volume hydrogen, 9% by volume ethylene and 1% by volume acetylene was passed over this catalyst. The rest of the gas consisted of carbon dioxide, methane and nitrogen. The gas flow was 100 parts by volume of synthesis gas per one part by volume of catalyst per hour. The synthesis temperature was maintained at approximately 170° C. The synthesis pressure was about 30 kg. per sq. cm. Under these conditions a ($CO+H_2$) conversion of 67% by volume was obtained. Carbon monoxide conversion was 73% by volume. The methane formation was 3%–4%.

The resulting liquid synthesis products contained approximately 20% by weight alcohols and 20% by weight esters and moreover about 35% by weight products boiling above 320° C., which consisted chiefly of hydrocarbons.

I claim:

1. In the catalytic hydrogenation of carbon monoxide, the improvement which comprises reacting a carbon monoxide hydrogen containing synthesis gas with a content of 0.5–10% by volume of an acetylenic hydrocarbon while in contact with a fixed bed precipitated iron synthesis catalyst impregnated with about 1–10%, calculated by weight $K_2O$, of an alkali salt of a substantially non-volatile inorganic acid and reduced at a temperature of about 250° C., substantially maintaining an initial synthesis temperature of about 20 degrees lower than that normal for said catalyst for a $CO-H_2$ conversion rate of about 65–70% by volume, and recovering synthesis products containing at least 30% by weight of hydrocarbons boiling above 320° C.

2. Improvement according to claim 1 in which said fixed bed precipitated iron synthesis catalyst is impregnated with about 1–10% calculated by weight $K_2O$ of a member selected from the group consisting of potassium phosphate and potassium silicate.

3. Improvement according to claim 1, in which said acetylenic hydrocarbon is present in amount of less than 10% by volume and including an olefinic hydrocarbon, said olefinic hydrocarbon being present in amount so that the volumetric total of acetylenic hydrocarbon and olefinic hydrocarbon does not exceed 10% by volume.

4. Improvement according to claim 1 in which said fixed bed precipitated iron synthesis catalyst is impregnated with about 3% calculated by weight $K_2O$ of a member selected from the group consisting of potassium phosphate and potassium silicate.

5. In the catalytic hydrogenation of carbon monoxide the improvement which comprises reacting a carbon monoxide hydrogen containing synthesis gas with a content of 0.5–10% by volume of an acetylenic hydrocarbon while in contact with a fixed bed precipitated iron synthesis catalyst impregnated with about 1–10% calculated by weight $K_2O$ of an alkali salt of a substantially non-volatile inorganic acid and reduced at a temperature of about 250° C., substantially maintaining an initial synthesis temperature of about 195–200° C. and recovering synthesis products containing at least 30% of hydrocarbons boiling above 320° C.

6. Improvement according to claim 5 in which said alkali salt of a substantially non-volatile inorganic acid is a member selected from the group consisting of potassium phosphate and potassium silicate.

7. Improvement according to claim 6 in which said alkali salt is present in amount of about 3% calculated by weight $K_2O$.

8. Improvement according to claim 5 in which said fixed bed precipitated iron synthesis catalyst has been reduced with a mixture of hydrogen and nitrogen substantially at a rate of gas flow of about 1 to 2 meters per second.

References Cited in the file of this patent

UNITED STATES PATENTS

| 2,254,806 | Michael | Sept. 2, 1941 |
| 2,287,891 | Linckh | June 30, 1942 |
| 2,365,094 | Michael et al. | Dec. 12, 1944 |
| 2,563,607 | Kirshenbaum et al. | Aug. 7, 1951 |

FOREIGN PATENTS

| 564,148 | France | Oct. 15, 1923 |

OTHER REFERENCES

"Interrogation of Dr. Otto Roelen," by Dr. Hall et al., Hobart Publishing Co., Washington, D. C. (1947), pages 37 and 38.